United States Patent [19]

Brand et al.

[11] 4,404,929

[45] Sep. 20, 1983

[54] LIQUID DISTRIBUTOR HEAD ACTUATED BY FLUID PRESSURE

[75] Inventors: Andreas Brand, Wettingen; Rudolf Datz, Klingnau, both of Switzerland

[73] Assignee: BBC Brown Boveri & Company Limited, Baden, Switzerland

[21] Appl. No.: 383,818

[22] Filed: Jun. 1, 1982

Related U.S. Application Data

[63] Continuation of Ser. No. 197,119, Oct. 15, 1980, abandoned.

[30] Foreign Application Priority Data

Nov. 8, 1979 [CH] Switzerland .................. 9999/79

[51] Int. Cl.³ ............................................. F22D 1/00
[52] U.S. Cl. ................................... 122/412; 122/436; 122/438; 122/442; 137/536; 239/288; 239/453; 239/459; 239/518; 261/62
[58] Field of Search ............... 122/1 C, 407, 412, 414, 122/415, 436, 437, 438, 442, 451.2, DIG. 15; 239/288, 453, 458, 459, 518; 137/454.5, 536, 592; 55/201; 261/66, 115, DIG. 33, 62, DIG. 13

[56] References Cited

U.S. PATENT DOCUMENTS

| 272,684 | 2/1883 | Hall | 137/592 |
|---|---|---|---|
| 1,828,473 | 10/1931 | Schellens | 122/438 |
| 1,842,962 | 1/1932 | Coppus | 122/422 X |
| 2,207,758 | 7/1940 | Rehse | 239/417 X |
| 2,422,059 | 6/1947 | Wilber | 239/453 |
| 2,582,527 | 11/1947 | Burnett | 239/459 |
| 2,671,524 | 7/1951 | Gilwood | 55/54 |
| 2,689,018 | 9/1954 | Kittredge | 55/201 X |
| 3,904,125 | 9/1975 | Allenbaugh | 239/459 X |

FOREIGN PATENT DOCUMENTS

| 562215 | 4/1922 | France . | |
| 562219 | 11/1923 | France . | |
| 37159 | 1/1936 | Netherlands | 261/116 |
| 308 | 3/1889 | Switzerland | 239/453 |

Primary Examiner—Albert J. Makay
Assistant Examiner—David E. Helmbold
Attorney, Agent, or Firm—Werner W. Kleeman

[57] ABSTRACT

In order to improve upon the prior arrangement of a valve within a liquid distributor head for a mixing pre-heater degasifier it is proposed that a valve containing a valve plate, valve shaft, valve spring and spring plate, is arranged within the mixing pre-heater centrally within a deflection screen or baffle and at the same time the valve is surrounded by a protective housing in order to prevent that, in the event of possible rupture of the valve spring any broken pieces thereof will drop into the mixing pre-heater.

3 Claims, 1 Drawing Figure

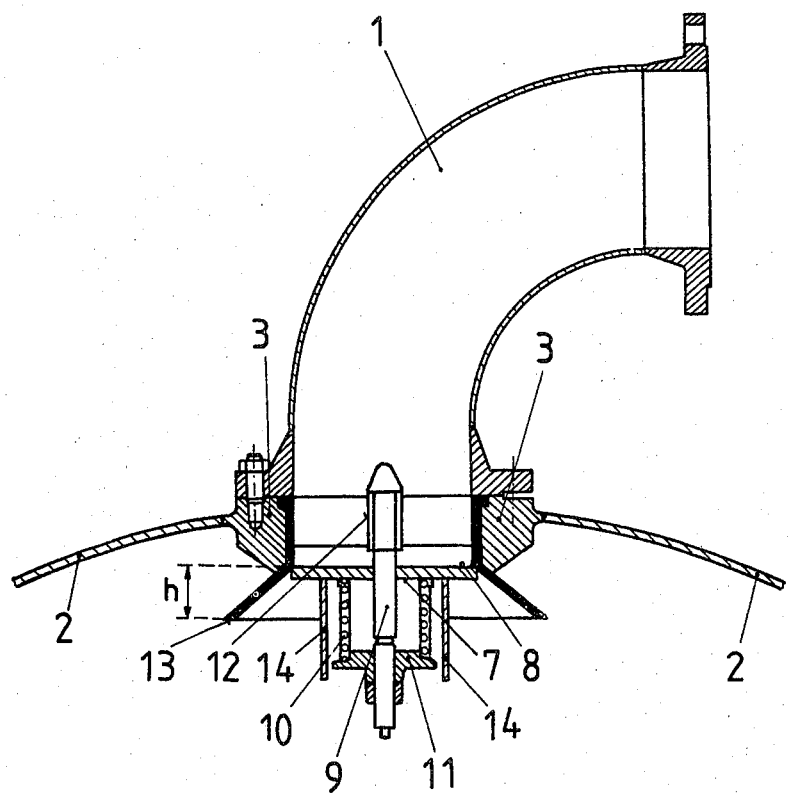

LIQUID DISTRIBUTOR HEAD ACTUATED BY FLUID PRESSURE

CROSS REFERENCE TO RELATED APPLICATION

This application is a continuation application of our commonly assigned, copending United States application, Ser. No. 197,119, filed Oct. 15, 1980, now abandoned.

BACKGROUND OF THE INVENTION

The present invention relates to a new and improved construction of liquid distributor head, especially for a mixing pre-heater degasifier of steam power plants, wherein in the housing upper portion there is provided a liquid infeed pipe bend, at the mouth of which there is arranged a spray device composed of a spring-loaded valve containing a truncated conical-shaped deflection screen or baffle.

With the heretofore known installations and methods there is used, among other things, a water atomizing nozzle which consists of a valve. The valve plate of the valve bears upon a conical collar and its valve shaft penetrates the pipe bend of the water infeed arrangement. The valve spring together with the adjustment device for the valve is located externally of the pipe bend. Significant in this regard is Swiss Pat. No. 436,344, granted May 31, 1967.

This heretofore known arrangement is associated with the drawback that, first of all, the infeed bend must be provided with an opening capable of receiving a fixture or attachment for the valve spring and the guide of the valve shaft, and additionally, with this design the valve shaft is extensively prone to the danger of corroding since it is immersed in the water flow. Moreover, there are present fabrication difficulties and complicated work is associated with the welding operations and the simultaneous sealing of the valve spring attachment.

SUMMARY OF THE INVENTION

Therefore with the foregoing in mind it is a primary object of the present invention to provide a new and improved construction of a liquid distributor head which is not associated with the aforementioned drawbacks and limitations of the prior art constructions.

Another and more specific object of the present invention aims at providing a new and improved construction of a liquid distributor head which, as opposed to heretofore known arrangements, can be located in the mixing pre-heater without the need for providing an additional opening at the inlet pipe bend and wherein as few parts as possible are subjected to the danger of corrosion.

Now in order to implement these and still further objects of the invention, which will become more readily apparent as the description proceeds, the invention contemplates that the valve containing the valve plate, valve spring and spring plate is arranged internally of the mixing pre-heater and centrally of the deflection screen or baffle and is surrounded by a substantially ring-shaped or annular protective housing which bears at the valve plate.

Due to the arrangement of the entire valve within the mixing pre-heater it is unnecessary for the liquid infeed bend to be provided with any opening for receiving the valve plate and the valve spring. Hence, the fabrication is appreciably simplified and additional welding work for the weld connection of the valve holder in the bend no longer is needed. In the case of possible rupture of the spring the fractured or broken pieces of the spring are retained between the protective housing and the spring plate and cannot enter the mixing pre-heater.

According to an advantageous design of the invention the deflection screen has a collar height which is about twice as large as the maximum gap when the valve is open.

Consequently, there is exploited tearing away of the water film at the conical surface, so that the pressure needed for spraying the water can be maintained relatively low.

Additionally, the valve can be attached along with the deflection screen at a flange of the mixing preheater.

Due to this arrangement it is possible in the event of failure of the valve, for instance due to spring breakage or upon occurrence of erosion phenomenon, to exchange the complete valve in a most simple manner.

BRIEF DESCRIPTION OF THE DRAWING

The invention will be better understood and objects other than those set forth above will become apparent when consideration is given to the following detailed description thereof. Such description makes reference to the annexed drawing wherein in the single FIGURE of the drawing there is shown in schematic fragmentary sectional view a liquid distributor head according to the invention.

DETAILED DESCRIPTION OF THE PREFERRED EMBODIMENTS

Describing now the drawing, reference character 1 designates a liquid infeed bend which is attached by means of a flange 3 or equivalent structure to the upper portion of a mixing pre-heater housing 2. The liquid infeed bend 1 opens into a valve 7 constructed as a spray device or insert. This valve 7 contains a valve plate 8, a valve shaft 9, a valve spring 10 and a spring plate 11. The valve 7 is arranged by means of a holder 12 in the flange 3 along with a deflection screen 13 constructed in the form of a truncated conical-shaped element such that its inner surface distributes the water which has been sprayed-in by the valve 7 upon the cylindrical portion of the inner surface of the mixing preheater 2. As previously mentioned, the deflection screen 13 advantageously has a collar height h which is about twice as large as the maximum gap when the valve is open. The valve spring 10 is surrounded by a ring-shaped protective housing 14 for protecting said valve spring from immersion in the fluid flow stream and in order to ensure that in the event of any possibly arising fracture of the spring no broken pieces of the spring can drop into the mixing pre-heater. The protective housing 14 can also consist of two housing halves which can concentrically slide within one another during movement of the spring 10.

By accommodating the opening of the valve plate 8 and the constant angle of the deflection screen 13 there occurs the breaking-up of the water into sufficiently fine droplets independent of the water throughflow. The pressure needed for spraying the water is relatively low. Hence, also the tension of the valve spring 10 can be set by means of the spring plate 11. Also the pressure loss of the sprayed-in water is maintained within modest limits;

the pressure drop varies in the order of magnitude between 3 and 5 m-water column over the entire range.

Due to the inventive valve construction there is extensively avoided clogging of the spray device. Such type spray device can also be used for basically all other liquids in other fields of application, for instance in the evaporation of sol or colloidal solutions, since very few parts must be formed of corrosion and erosion-resistant materials.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A liquid distributor head, especially for a mixing pre-heater and degasifier of a steam power plant, comprising:

means defining a pre-heater having a preheater housing with an upper housing portion;

a liquid infeed bend provided for said upper housing portion;

said bend having a mouth portion;

a spray device, arranged at the mouth portion of said bend, for spraying a liquid flow stream into the pre-heater;

a substantially truncated cone-shaped deflection screen provided for said spray device;

said spray device embodying a valve comprising a valve plate, valve spring and spring plate, said valve spring and said spring plate being arranged beneath said valve plate, said valve being arranged internally of the mixing preheater and substantially centrally of said deflection screen but externally of the liquid flow stream; and a substantially ring-shaped protective housing means, surrounding said valve spring and bearing against said valve plate, for preventing broken spring pieces from dropping into the mixing preheater and additionally protecting said valve spring from immersion in the liquid flow stream.

2. The liquid distributor head as defined in claim 1, wherein:

said deflection screen possesses a collar having a height approximately twice as large as the maximum valve gap when the valve is open.

3. The liquid distributor head as defined in claim 1, wherein:

said mixing pre-heater contains a flange; and said valve together with said deflection screen being secured at said flange.

* * * * *